United States Patent
Liu et al.

(10) Patent No.: US 12,506,848 B2
(45) Date of Patent: Dec. 23, 2025

(54) FILTER ELEMENT AND PROJECTION DEVICE

(71) Applicant: Coretronic Corporation, Hsin-Chu (TW)

(72) Inventors: Chi-Fu Liu, Hsin-chu (TW);
Tsung-Hsin Liao, Hsin-Chu (TW);
Kun-Liang Jao, Hsinchu (TW);
Hung-Yu Lin, Hsin-chu (TW)

(73) Assignee: Coretronic Corporation, Hsin-Chu (TW)

( * ) Notice: Subject to any disclaimer, the term of this patent is extended or adjusted under 35 U.S.C. 154(b) by 518 days.

(21) Appl. No.: 18/173,700

(22) Filed: Feb. 23, 2023

(65) Prior Publication Data
US 2023/0276031 A1    Aug. 31, 2023

(30) Foreign Application Priority Data

Feb. 25, 2022 (CN) .......................... 202210178168.6

(51) Int. Cl.
*H04N 9/31* (2006.01)

(52) U.S. Cl.
CPC ......... *H04N 9/3158* (2013.01); *H04N 9/3111* (2013.01); *H04N 9/317* (2013.01); *H04N 9/3197* (2013.01)

(58) Field of Classification Search
CPC .... G03B 21/00; G03B 21/006; G03B 21/008; G03B 21/28; G03B 21/2053; H04N 9/315; H04N 9/3102; H04N 9/3105; H04N 9/3111; H04N 9/3152; H04N 9/3158; H04N 9/3197; G02B 5/208; G02B 5/282; G02B 5/283
See application file for complete search history.

(56) References Cited

U.S. PATENT DOCUMENTS

| | | | |
|---|---|---|---|
| 2020/0004120 A1* | 1/2020 | Chen | G03B 21/00 |
| 2020/0064195 A1* | 2/2020 | Gallinet | G01J 3/1895 |
| 2022/0223652 A1* | 7/2022 | Li | H10K 77/10 |

FOREIGN PATENT DOCUMENTS

| | | |
|---|---|---|
| CN | 110456603 | 11/2019 |
| CN | 210090716 | 2/2020 |

\* cited by examiner

*Primary Examiner* — Sultan Chowdhury
(74) *Attorney, Agent, or Firm* — JCIPRNET (57) ABSTRACT

A filter element and a projection device are provided. The filter element is configured on the transmission path of at least one light beam, and includes a substrate and a film. The film is located on a surface of the substrate, and includes a first area and a second area. The first area includes a center, corresponding to the central axis of the at least one light beam. The distance between the second area and the center of the first area is greater than the distance between any point in the first area and the center. The average thickness of the second area of the film is greater than the average thickness of the first area of the film. The filter element of the disclosure may still have a similar filter effect when the incident angle is relatively large.

20 Claims, 7 Drawing Sheets

FILTER ELEMENT AND PROJECTION DEVICE

CROSS-REFERENCE TO RELATED APPLICATION

This application claims the priority benefit of China application serial no. 202210178168.6, filed on Feb. 25, 2022. The entirety of the above-mentioned patent application is hereby incorporated by reference herein and made a part of this specification.

BACKGROUND

Technical Field

The disclosure relates to an optical element and a device, and in particular, to a filter element and a projection device.

Description of Related Art

Current projection systems are often disposed with illumination module that include multi-color light sources. The illumination module includes, for example, multiple light sources for emitting at least two or more light beams of red light, blue light, and green light, or the illumination module includes a single light source, and the light beam emitted by the single light source may be processed by other optical elements for color separation in the illumination module to provide red light, blue light, and green light.

In order to meet the requirements of the display market, the projection system must meet the color gamut standards for the target range of the color gamut of the display (e.g., DCI-P3, NTSC, and BT.2020). To this end, a filter element (e.g., a bandpass filter) may be used in the projection system to adjust the spectrum of the light beam. However, if the position of the light beam entering the filter element is not collimated, and the incident angle between the light beam and the filter element is relatively large, the transmission band of the filter element would shift toward the short wavelength side and cause the phenomenon of blue shift, resulting in the change of color coordinates and uneven color of the light beam after passing through the filter element.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The disclosure provides a filter element, which may provide good filter quality. The disclosure also provides a projection device, which may provide good color performance. Other objectives and advantages of the disclosure may be further understood from the technical features disclosed in the disclosure.

To achieve one or part or all of the above-mentioned objectives or other objectives, an embodiment of the disclosure proposes a filter element, which is configured to be disposed on a transmission path of at least one light beam. The filter element includes a substrate and a film. The film is located on a surface of the substrate, and the film includes a first area and a second area. The first area includes a center, and the center corresponds to the central axis of the at least one light beam. The distance between the second area and the center of the first area is greater than the distance between any point in the first area and the center, and the average thickness of the second area of the film is greater than the average thickness of the first area of the film.

To achieve one or part or all of the above-mentioned objectives or other objectives, an embodiment of the disclosure proposes a projection device, which includes an illumination system, a light valve, and a projection lens. The illumination system is configured to provide an illumination beam. The light valve is located on the transmission path of the illumination beam, and is configured to convert the illumination beam into an image beam. The projection lens is located on the transmission path of the image beam, and is configured to project the image beam out of the projection device. The illumination system includes a light source module and a filter element, the light source module is configured to emit multiple light beams, and the illumination beam includes at least part of light beams. The filter element is located on the transmission paths of the light beams and is located between the light source module and the light valve. Moreover, the filter element includes a substrate and a film. The film is located on a surface of the substrate, and the film includes a first area and a second area. The first area includes a center, and the center corresponds to the central axes of the light beams. The distance between the second area and the center of the first area is greater than the distance between any point in the first area and the center, and the average thickness of the second area of the film is greater than the average thickness of the first area of the film.

Based on the above, embodiments of the disclosure have at least one of the following advantages or effects. In the embodiment of the disclosure, by disposing the film of the filter element and making the average thickness oft the second area of the film in the peripheral region to be greater than the average thickness of the first area of the film, the phase difference of the light beam after passing through the first area and the second area of the film is closer. Thus, the filter element may still have the similar filtering effect when the incident angle is relatively large, thereby improving the phenomenon of blue shift in the transmission band of the filter element and the problem of uneven color of the projection device.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
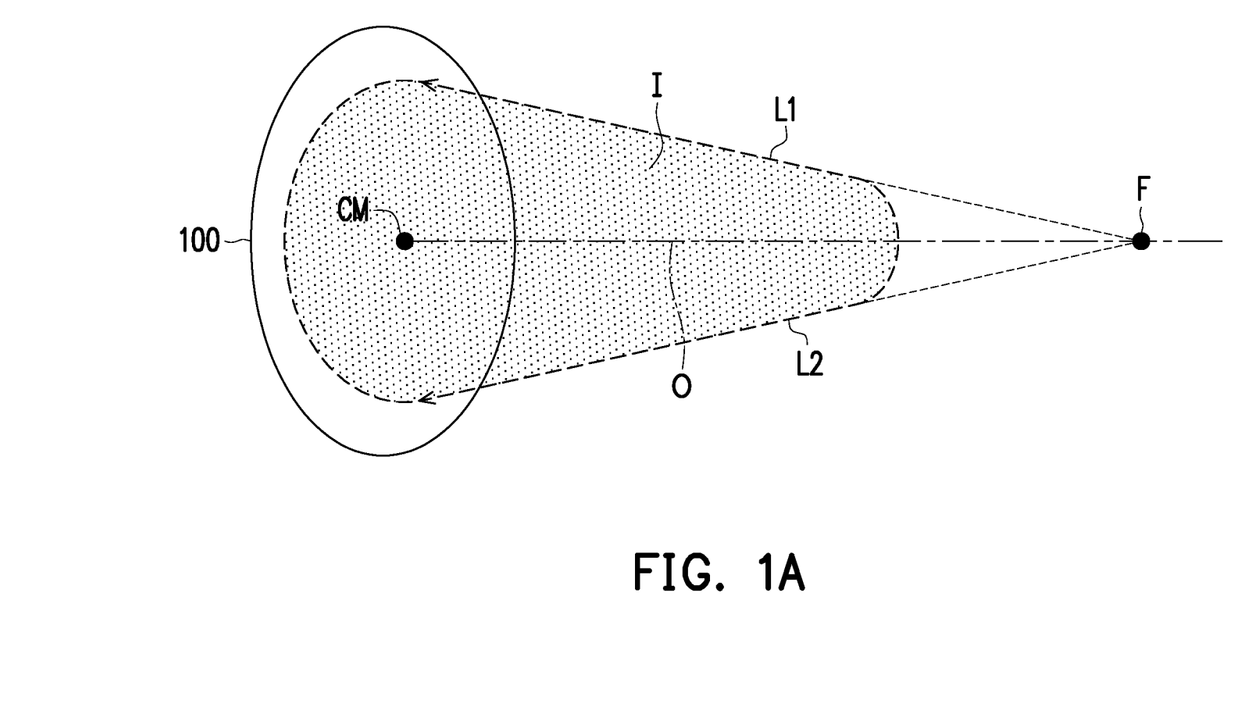
FIG. 1A is a schematic diagram of a filter element according to an embodiment of the disclosure.
Figure 1B:
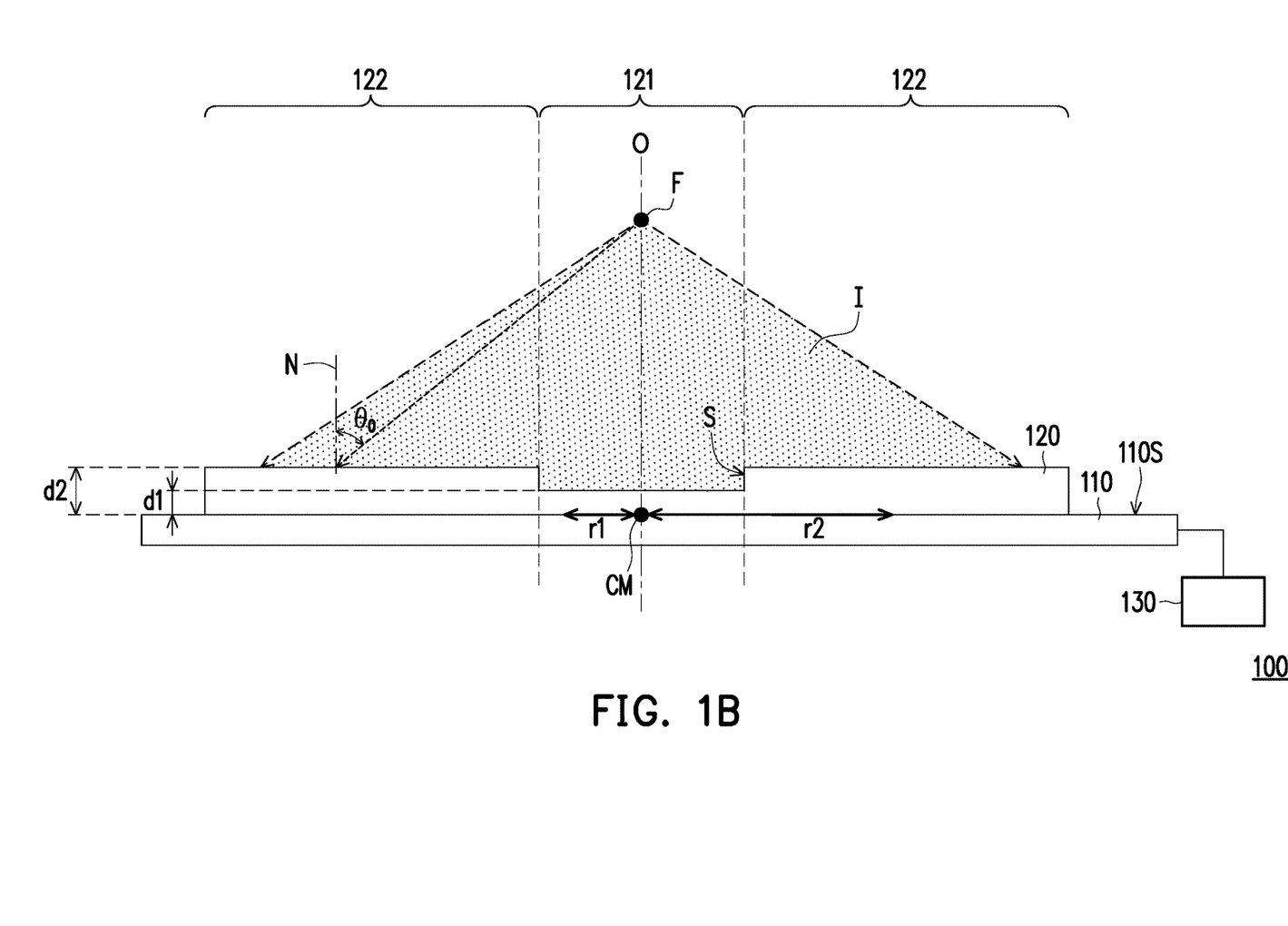
FIG. 1B is a schematic cross-sectional view of the filter element of FIG. 1A.

FIG. 1A is a schematic diagram of a filter element according to an embodiment of the disclosure. FIG. 1B is a schematic cross-sectional view of the filter element of FIG. 1A. Please refer to FIGS. 1A and 1B. In the embodiment, a filter element 100 is disposed on the transmission path of at least one light beam I. The filter element 100 may be a bandpass filter. The light beam I may be a light beam from any type of a light source (e.g., light emitting diodes, laser diodes, fluorescent materials, and the like), which is not limited in the disclosure. The light beam I may include a central axis O.

The filter element 100 includes a substrate 110 and a film 120. In the embodiment, the film 120 may be an anti-reflection film, the substrate 110 is, for example, a light-pervious substrate, and the film 120 is, for example, made of light-pervious silicon dioxide ($SiO_2$). Those skilled in the art may select appropriate materials to form the substrate 110 and the film 120 according to actual needs, that is, the substrate may be a reflective substrate as long as the film 120 can achieve the effect of adjusting the spectrum of the light beam, which is not limited in the disclosure. The film 120 may be a single-layered film disposed on the substrate 110, or may be a multilayered film disposed on the substrate 110. In some embodiments, the refractive index of the substrate 110 is greater than the refractive index of the film 120, but the disclosure is not limited thereto. The film 120 is located on a surface 1105 of the substrate 110. In one embodiment, the film 120 may be directly formed (e.g., by a coating process) on the surface 1105 of the substrate 110, and the surface 1105 faces towards the light source.

The film 120 includes a first area 121 and a second area 122 disposed adjacently. The first area 121 includes a center CM. The center CM is a fixed point on the film 120. The center CM of the first area 121 in FIG. 1B is shown at the junction interface of the film 120 of the first area 121 and the surface 1105 of the substrate 110, but the disclosure is not limited thereto. The center CM may be located at the geometric center of the first area 121 of the film 120, may be located on the upper surface of the film 120 corresponding to the first area 121, or may be located at any position which is on a line parallel to a normal line N of the substrate 110 and is located in the first area 121 of the film 120. A distance r2 between the second area 122 and the center CM is greater than a distance r1 between any point in the first area 121 and the center CM. That is, the center CM is located in the first area 121, and the second area 122 is located at the periphery of the first area 121. The filter element 100 may be configured that the center CM of the first area 121 of the film 120 corresponds to the center axis O of the light beam I. In the embodiment, the central axis O of the light beam I is, for example, parallel to the normal line N of the substrate 110 and has an intersection with the center CM of the first area 121 of the film 120.

In the embodiment, an average thickness d2 of the film in the second area 122 is greater than an average thickness d1 of the film in the first area 121. In the description, the average thickness of the film refers to the distance from the surface 1105 of the substrate 110 to the topmost surface of the film along the direction of the normal line N of the substrate 110. In the embodiment of the disclosure, the light beam I has a relatively small incident angle as being incident on the first area 121, and has a relatively large incident angle as being incident on the second area 122. Therefore, by making the average thickness of the film in the second area 122 in the peripheral region greater than the average thickness of the film in the first area 121 in the central region, the phase difference of the light beam I after passing through the first area 121 and the second area 122 of the film 120 may be closer, so that the filter element 100 has the similar filtering effect in the first area 121 (relatively small incident angle) and the second area 122 (relatively large incident angle), thereby improving the phenomenon of blue shift in the transmission band of the filter element when the incident angle is relatively large.

Please refer to FIGS. 1A and 1B again. In the embodiment, the first area 121 and the second area 122 are, for example, annular areas and are concentrically disposed around the center CM. In addition, in the embodiment, the second area 122 adjoins and surrounds the first area 121. Since the average thickness of the first area 121 of the film 120 is different from the average thickness of the second area 122 of the film 120, the film 120 has a level difference S at the boundary between the first area 121 and the second area 122, forming a stepped intersection. In the embodiment, the average thickness of the first area 121 of the film 120 and the average thickness of the second area 122 of the film 120 may be, respectively, a fixed value. The level difference S of the film 120 at the boundary between the first area 121 and the second area 122 refers to, for example, the difference between the thickness of the second area 122 and the thickness of the first area 121 in the direction of the normal line N of the substrate 110.

In addition, in some embodiments, the average thickness d of the film may conform to:

$$d = \delta * \lambda / (4 * \pi * \cos[\sin^{-1}((n_0/n) * \sin \theta_0)]) \quad \text{(formula 1)}$$

In the formula 1, $\lambda$ is the wavelength of the at least one light beam I, n is the refractive index of the film 120, $n_0$ is the refractive index of air, $\theta_0$ is an included angle between the light beam I and the normal line N of the substrate 110, $\pi$ is the circular constant, and $\delta$ is the phase difference and $\delta$ is M/2, where M is an odd number greater than 0. Referring to FIG. 1A, two peripheral rays L1 and L2 of the light beam I (illustrated by dashed lines L1, L2) extend and intersect at a focal point F. The focal point F is on the central axis O. The light beam I, for example, diverges from a convergence point (the focal point) and is transmitted to the filter element 100, and the two peripheral rays L1 and L2 of the light beam I are two rays with the maximum divergence angle of the light beam I relative to the central axis O. As shown in FIG. 1B, a ray from the focal point F to an incident point on the surface of the film 120 defines an angle $\theta_0$ between the light beam I incident on the film 120 and the normal line N of the substrate 110. Furthermore, in the case that the film 120 is the multilayered film and includes multiple layers, the total thickness of the film 120 may be the sum of the average thicknesses d of the individual layers.

For example, if the wavelength $\lambda$ of the light beam I is 550 nanometers (nm), the material of the film 120 is silicon dioxide ($SiO_2$), and the refractive index n of the silicon dioxide is 1.5, each included angle $\theta_0$, phase difference $\delta$, and the corresponding thickness d of the film 120 calculated according to the formula 1 are shown in the following table:

| Phase difference $\delta$ (M = 1 · 3 · 5) | Included angle $\theta_0$ (degree) | Thickness d of film (nanometer (nm)) |
|---|---|---|
| 1/2 | 0 | 14.6 |
| 1/2 | 10 | 14.7 |
| 1/2 | 20 | 15.0 |
| 1/2 | 30 | 15.5 |
| 1/2 | 40 | 16.1 |
| 1/2 | 50 | 17.0 |
| 1/2 | 60 | 17.9 |
| 3/2 | 0 | 43.8 |
| 3/2 | 10 | 44.1 |
| 3/2 | 20 | 45.0 |
| 3/2 | 30 | 46.4 |
| 3/2 | 40 | 48.4 |
| 3/2 | 50 | 50.9 |
| 3/2 | 60 | 53.6 |
| 3/2 | 0 | 72.9 |
| 5/2 | 10 | 73.4 |
| 5/2 | 20 | 74.9 |
| 5/2 | 30 | 77.4 |
| 5/2 | 40 | 80.7 |
| 5/2 | 50 | 84.8 |
| 5/2 | 60 | 89.3 |

Please refer to FIG. 1B again. In the embodiment, the first area 121 includes an area illuminated by a part of the light beam I with a range of the included angles between 0 degrees and 20 degrees, and the range of the included angles $\theta_0$ from 0 degrees to 20 degrees is defined by the part of the light beam I and the normal line N of the substrate 110. The second area 122 includes an area illuminated by another part of the light beam I with a range of the included angles between 20 degrees and 60 degrees, and the range of the included angles $\theta_0$ from 20 degrees to 60 degrees is defined by the another part of the light beam I and the normal line N of the substrate 110, but the disclosure is not limited thereto. The average thickness of the first area 121 and the average thickness of the second area 122 of the film 120 may be calculated according to the formula 1 by selecting appropriate values from the values of the included angles $\theta_0$ covered by the respective areas. According to the calculation results in the above table, the thickness d of the first area 121 of the film 120 may be designed, for example, between 14.6 nm and 15 nm, and the thickness d of the second area 122 of the film 120 may be designed, for example, between 15 nm and 17.9 nm. When this condition is met, the filter element 100 may still have the similar filtering effect when the incident angle is relatively large, thereby improving the phenomenon of blue shift in the transmission band of the filter element. Moreover, the influence of the manufacturing tolerance on the thickness of the film (for example, 3%) is also included in the scope contemplated by the disclosure.

In some embodiments, each of the average thickness d of the first area 121 of the film 120 and the average thickness d of the second area 122 of the film 120 is inversely proportional to $\cos[\sin^{-1}((n_0/n) * \sin \theta_0)]$, where N is an appropriate value selected from the values of the included angles covered by the first area 121 and the second area 122. When this condition is met, the filter element 100 may still have similar filtering effect in areas including different ranges of the included angle $\theta_0$, thereby improving the phenomenon of blue shift in the transmission band of the filter element. Moreover, the influence of the manufacturing tolerance on the thickness of the film (for example, 3%) is also included in the scope contemplated by the disclosure. According to the calculation results in the above table, and considering the thickness of the film having a tolerance of 3% owing to the manufacturing tolerance, the thickness of t the first area of the film may be designed, for example, between 14.16 nm and 15.45 nm, and the thickness of the second area of the film may be designed, for example, between 14.55 nm and 18.44 nm.

In addition, in the embodiment, the filter element 100 may further include an actuating device 130. The actuating device 130 is adapted to move the filter element 100 out of or into the transmission path of the at least one light beam I. By the configuration of the actuating device 130, the filter element 100 may be selected or may not be selected in different scenarios to meet the image color requirements of different uses. Those skilled in the art may select the mechanism design and power source of the actuating device 130 according to requirements, which is not limited in the disclosure.

Figure 1C:
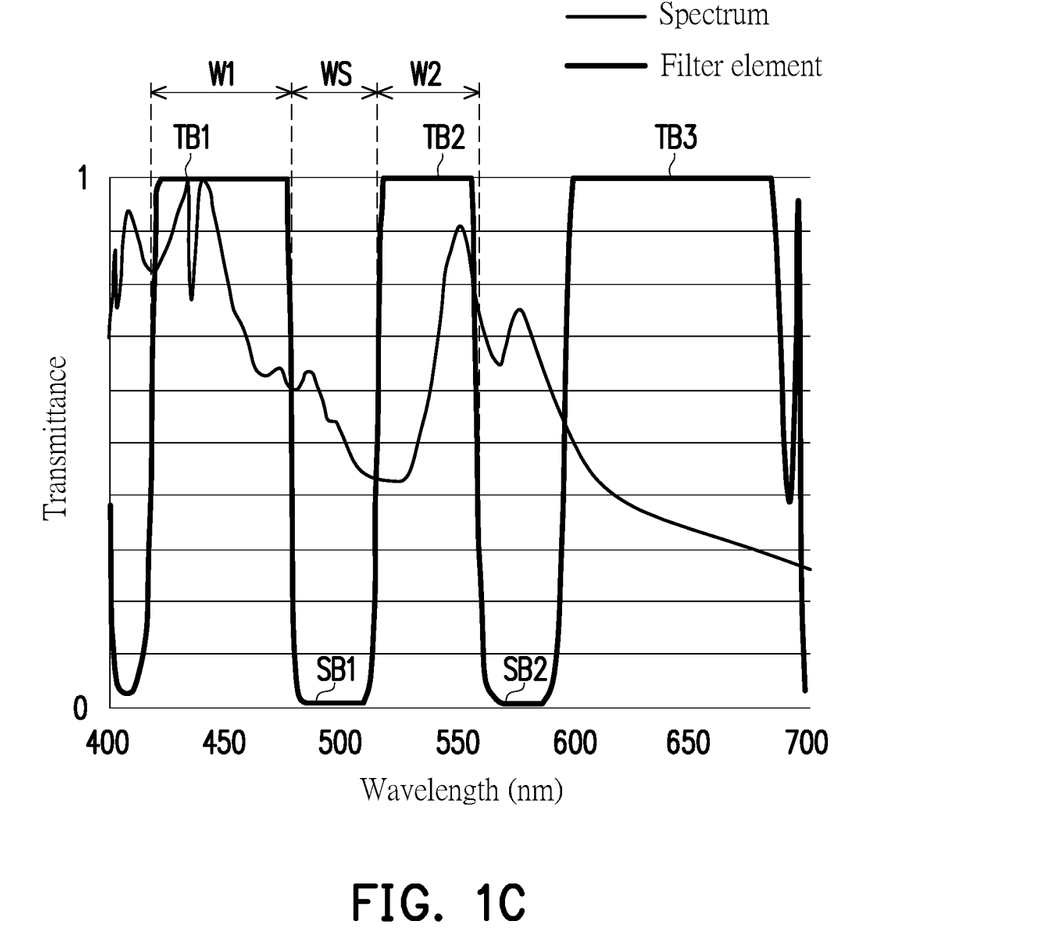
FIG. 1C shows the transmittance of the filter element of FIG. 1A for different wavelengths.

FIG. 1C shows the transmittance of the filter element of FIG. 1A for different wavelengths. Please refer to FIG. 1C. The thin solid line shows the spectrum of an example of the light beam I, and the light beam I, for example, includes a continuous broad spectrum. The thick solid line shows the transmittance of the filter element 100 of FIG. 1A for different wavelengths. The filter element 100 includes a first transmission band TB1, a second transmission band TB2, and a cut-off band SB1. Bandwidths W1 and W2 of the first transmission band TB1 and the second transmission band TB2 may be greater than 30 nm. The cut-off band SB1 is located between the first transmission band TB1 and the second transmission band TB2, and a bandwidth WS of the cut-off band SB1 may be greater than 10 nm. Therefore, the filter element 100 may achieve the function of bandpass filtering. As shown in FIG. 1C, the filter element 100 may further include a third transmission band TB3 and a cut-off band SB2. The cut-off band SB2 is located between the second transmission band TB2 and the third transmission band TB3. In some embodiments, the first transmission band TB1, the second transmission band TB2, and the third transmission band TB3 may correspond to three colors of blue, green, and red, respectively, that is, the filter element 100 allows blue light of a specific wavelength band, green light of a specific wavelength band, and red light of a specific wavelength band to pass through, so as to provide the filtering effect required by the projection device and the display device.

Figure 2:
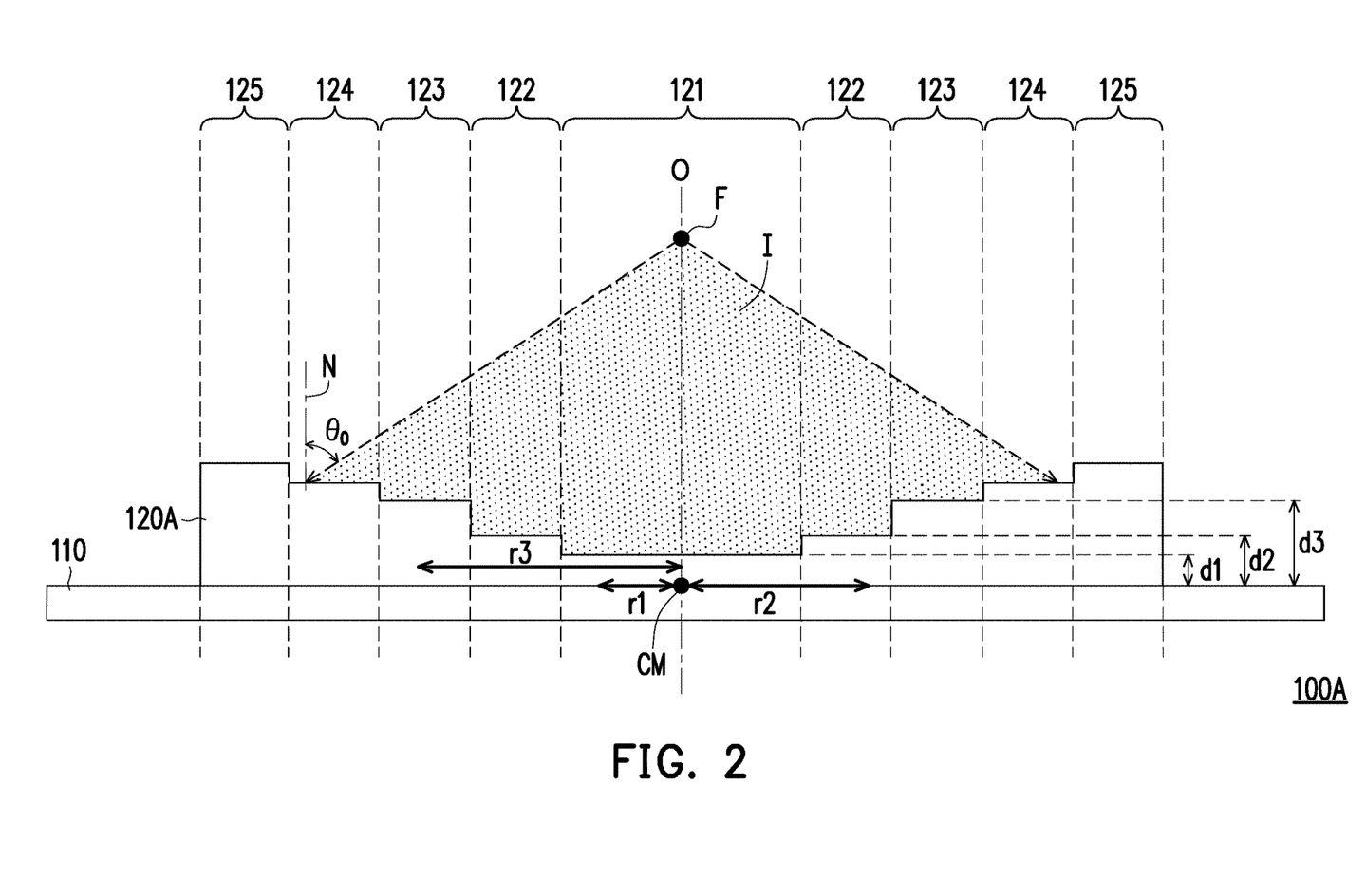
FIG. 2 is a schematic cross-sectional view of a filter element according to another embodiment of the disclosure.

FIG. 2 is a schematic cross-sectional view of a filter element according to another embodiment of the disclosure. Please refer to FIG. 2. A filter element 100A of the embodiment of FIG. 2 is similar to the filter element 100 of FIG. 1, with the differences described below. In the embodiment, a film 120A disposed on the substrate 110 further includes a third area 123. A distance r3 between the third area 123 and the center CM is greater than the distance r2 between any point in the second area 122 and the center CM. That is, the third area 123 adjoins and surrounds the second area 122 and is located adjacent to the periphery of the second area 122. In the embodiment, the average thickness d3 of the third area 123 of the film 120A is greater than the average thickness d2 of the second area 122 of the film 120A. By making the average thickness d3 of the third area 123 of the film 120A in the peripheral region greater than the average thickness d2 of the second area 122 of the film 120A in the relatively inner region, the phase difference of the light beam I after passing through the second area 122 of the film 120A and the third area 123 of the film 120A may be closer, and the filter element 100A has the similar filtering effect in the first area 121 to the third area 123, thereby improving the phenomenon of blue shift in the transmission band of the filter element.

Please refer to FIG. 2 again. In detail, the filter element 100A further includes a fourth area 124 and a fifth area 125. The fourth area 124 adjoins and surrounds the third area 123 and is located adjacent to the periphery of the third area 123, and the fifth area 125 adjoins and surrounds the fourth area 124 and is located adjacent to the periphery of the fourth area 124. The average thickness of the fourth area 124 of the film 120A is greater than the average thickness d3 of the third area 123 of the film 120A, and the average thickness of the fifth area 125 of the film 120A is greater than the average thickness of the fourth region 124 of the film 120A. In one embodiment, referring to FIGS. 1 and 2, the first area 121, the second area 122, the third area 123, the fourth area 124, and the fifth area 125 are, for example, annular areas and are concentrically disposed around the center CM.

For example, in the embodiment, the first area 121 includes an area illuminated by a first part of the light beam I with a range of the included angles between 0 degrees and 10 degrees, and the range of the included angles $\theta_0$ from 0 degrees to 10 degrees is defined by the first part of the light beam I and the normal line N of the substrate 110. The second area 122 includes an area illuminated by a second part of the light beam I with a range of the included angles between 10 degrees and 20 degrees, and the range of the included angles $\theta_0$ from 10 degrees to 20 degrees is defined by the second part of the light beam I and the normal line N of the substrate 110. The third area 123 includes an area illuminated by a third part of the light beam I with a range of the included angles $\theta_0$ between 20 degrees and 30 degrees, and the range of the included angles $\theta_0$ from 20 degrees to 30 degrees is defined by the third part of the light beam I and the normal line N of the substrate 110. The fourth area 124 includes an area illuminated by a fourth part of the light beam I with a range of the included angles between 30 degrees and 40 degrees, and the range of the included angles $\theta_0$ from 30 degrees to 40 degrees is defined by the fourth part of the light beam I and the normal line N of the substrate 110. The fifth area 125 includes an area illuminated by a fifth part of the light beam I with a range of the included angles between 40 degrees and 50 degrees, and the range of the included angle $\theta_0$ from 40 degrees to 50 degrees is defined by the fifth part of the light beam I and the normal line N of the substrate 110. However, the disclosure is not limited thereto. The average thickness of each of the first area 121 to the fifth area 125 of the film 120A may be calculated according to the formula 1 by selecting an appropriate value from the values of the included angles $\theta_0$ covered by the respective areas. When this condition is met, the filter element 100 may still have the similar filtering effect when the incident angle is relatively large, thereby improving the phenomenon of blue shift in the transmission band of the filter element. Moreover, the influence of the manufacturing tolerance on the thickness of the film (for example, 3%) is also included in the scope contemplated by the disclosure.

Figure 3:
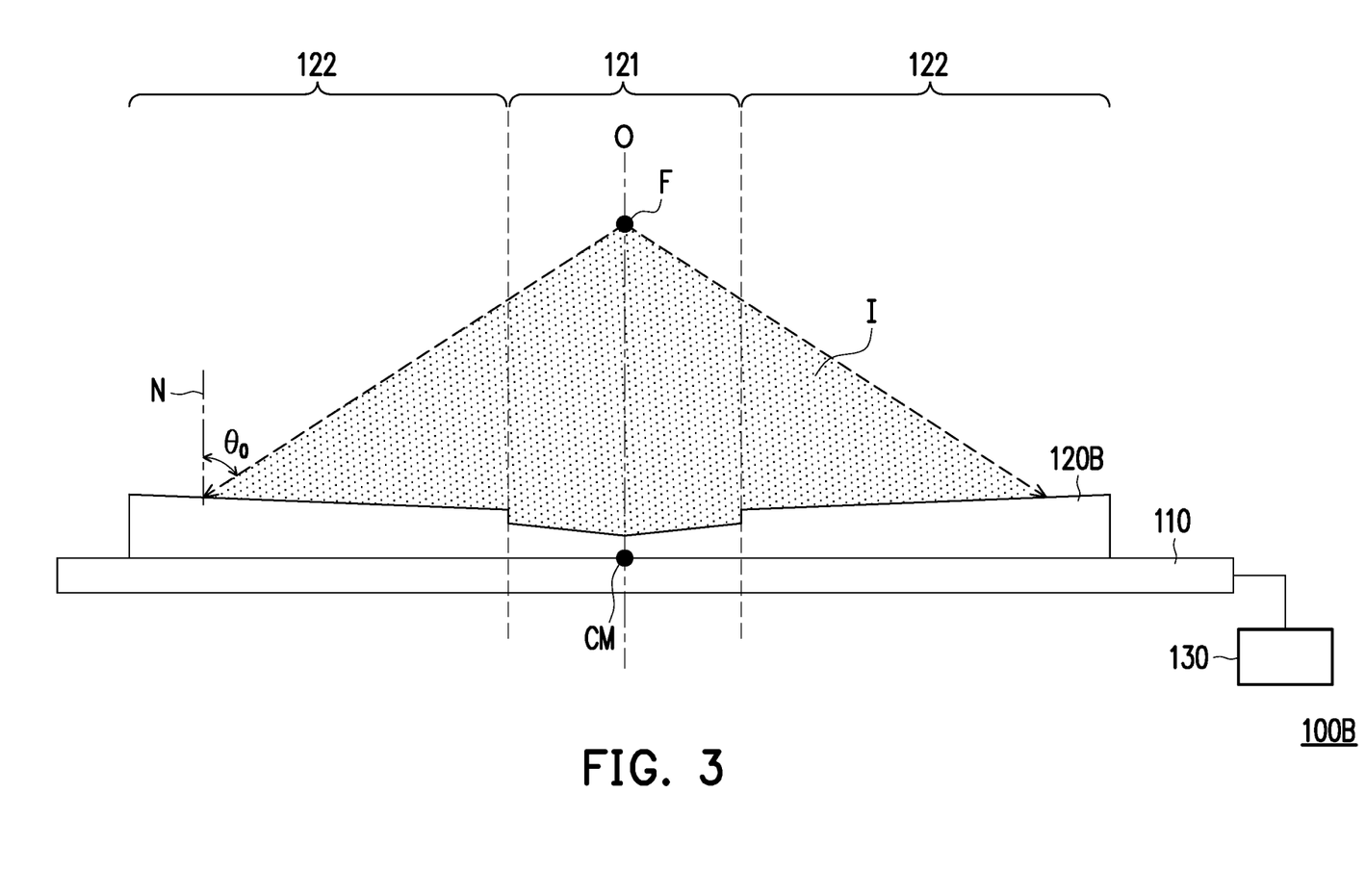
FIG. 3 is a schematic cross-sectional view of a filter element according to yet another embodiment of the disclosure.

FIG. 3 is a schematic cross-sectional view of a filter element according to yet another embodiment of the disclosure. Please refer to FIG. 3. A filter element 100B of the embodiment of FIG. 3 is similar to the filter element 100 of FIG. 1, with the differences described below. In the embodiment, a film 120B has a greater thickness of the first area 121 where the distance from the center CM is larger. That is, the average thickness of the first area 121 of the film 120B is not a fixed value, but gradually increases away from the center CM. In addition, in the embodiment, the average thickness of the second area 122 of the film 120B also gradually increases away from the center CM.

For example, in the embodiment, the first area 121 includes an area illuminated by a part of the light beam I with a range of the included angles between 0 degrees and 20 degrees, and the range of the included angles $\theta_0$ from 0 degrees to 20 degrees is defined by the part of the light beam I and the normal line N of the substrate 110. The second area 122 includes an area illuminated by another part of the light beam I with a range of the included angles between 20 degrees and 60 degrees, and the range of the included angles $\theta_0$ from 20 degrees to 60 degrees is defined by the another part of the light beam I and the normal line N of the substrate 110. Since the angle $\theta_0$ between the light beam I and the normal line N of the substrate 110 has increasing values with the distance from the center CM, the first area 121 of the film 120B may be designed with a gradually greater thickness of the film in the range of 0 degrees to 20 degrees with the distance from the center CM calculated according to the formula 1. However, the disclosure is not limited thereto.

Figure 4:
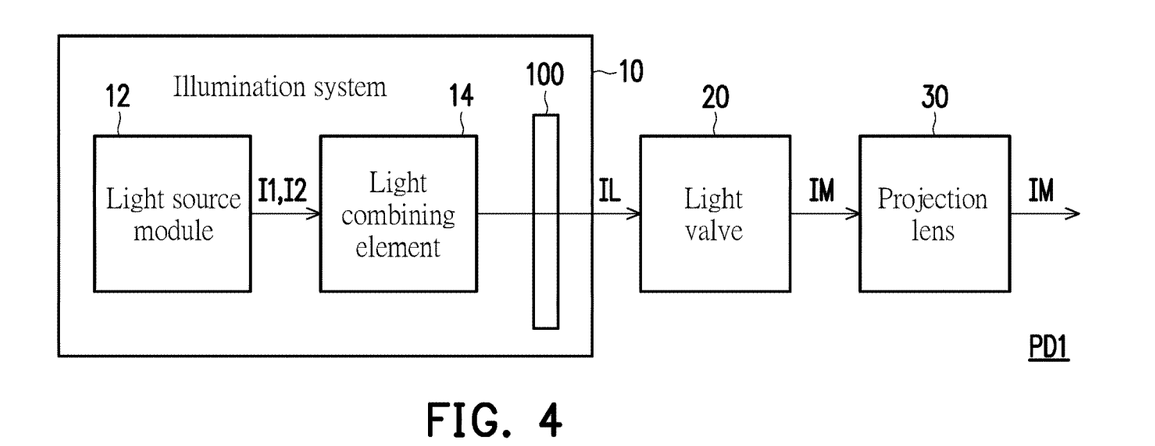
FIG. 4 is a schematic structural diagram of a projection device according to an embodiment of the disclosure.

FIG. 4 is a schematic structural diagram of a projection device according to an embodiment of the disclosure. Please refer to FIG. 4. In the embodiment, a projection device PD1 includes an illumination system 10, a light valve 20, and a projection lens 30. The illumination system 10 is configured to provide an illumination beam IL. The light valve 20 is located on the transmission path of the illumination beam IL, and is configured to convert the illumination beam IL into an image beam IM. The projection lens 30 is located on the transmission path of the image beam IM from the light valve 20, and is configured to project the image beam IM out of the projection device PD1.

The illumination system 10 includes a light source module 12 and the filter element 100. The light source module 12 may include one or more laser diodes, light emitting diodes, fluorescent materials and the like, which is not limited in the disclosure. The light source module 12 is configured to emit multiple light beams I1 and I2. The filter element 100 is located on the transmission paths of the light beams I1 and I2, and is located between the light source module 12 and the light valve 20. The illumination beam IL includes at least part of the light beams I1 and I2. The filter element 100 may be similar to the filter element 100 described in FIGS. 1A to 1C, and may also be replaced with the filter element 100A and the filter element 100B described in FIGS. 2 to 3. The light beams I1 and I2 may have a common central axis (similar to the central axis O as shown in FIG. 1). The filter element 100 may be disposed such that the center of the first area corresponds to the central axes of the light beams I1 and I2. Therefore, the spectra of the light beams I1 and I2 may be limited and adjusted by the filter element 100.

As previously described for the filter element 100 with reference to FIGS. 1A and 1B, in the embodiment, the film of the filter element 100 includes the first area and the second area, and the average thickness of the second area of the film is greater than the average thickness of the first area of the film, so the phase difference of the light beams I1 and I2 after passing through the first area and the second area of the film on the filter element 100 may be closer, and the filter element 100 has the similar filtering effect in the first area and the second area. Therefore, in the case that the light beams I1 and I2 are not collimated, the phenomenon of blue shift in the transmission band of the filter element may still be improved, thereby improving the problem of uneven color of the projection device.

Please continue to refer to FIG. 4. In the embodiment, the projection device PD1 further includes a light combining element 14. The light combining element 14 is adapted to combine multiple light beams I1 and I2 from different light sources into one light beam (the combined light beam may be, for example, the light beam I shown in FIG. 1). Moreover, the light combining element 14 may combine light beams of different light sources, different wavelengths, and/or different paths in the light source module 12 into the same path. The light combining element 14 may include optical elements such as a collimator, a condenser, and/or a dichroic mirror, but the disclosure is not limited thereto. In the embodiment, the light combining element 14 is disposed on the transmission paths of the light beams I1 and I2, and is located between the light source and the light valve 20. The filter element 100 is located between the light combining element 14 and the light valve 20. By disposing the filter element 100 at the downstream side of the light combining element 14, the filter element 100 may be disposed on the common path of different color lights to reduce space and costs of elements, but the disclosure is not limited thereto.

Furthermore, in some embodiments, the projection device PD1 may include a first mode and a second mode. In the first mode, the filter element 100 is located on the transmission paths of the light beams I1 and I2. In the second mode, the filter element 100 is not located on the transmission paths of the light beams I1 and I2. For example, in the first mode, the beams are adjusted by the filter element 100 to form the illumination beam IL and the image beam IM of the projection device PD1 so as to conform to one or more target color gamut standards; and in the second mode, the beams are not adjusted by the filter element 100 and the illumination beam IL and the image beam IM of the projection device PD1 may have higher brightness. In some embodiments, as previously described for the filter element 100 with reference to FIGS. 1A and 1B, the filter element 100 may include the actuating device adapted to move the filter element 100 out of or into the transmission paths of the light beams I1 and I2, so that the projection device PD1 is able to be switched between the first mode and the second mode.

Figure 5:
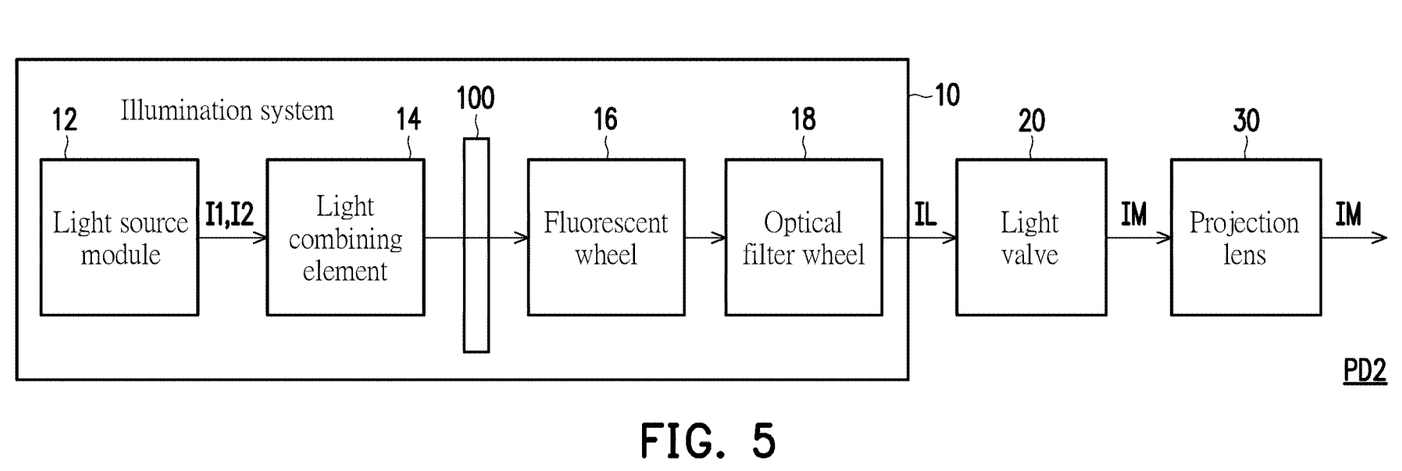
FIG. 5 is a schematic structural diagram of a projection device according to another embodiment of the disclosure.

FIG. 5 is a schematic structural diagram of a projection device according to another embodiment of the disclosure. Please refer to FIG. 5. A projection device PD2 of the embodiment of FIG. 5 is similar to the projection device PD1 of FIG. 4, with the differences as described below. In the embodiment, the projection device PD2 further includes a fluorescent wheel 16 and an optical filter wheel 18 located on the transmission paths of the light beams I1 and I2 and located between the light combining element 14 and the light valve 20, but the disclosure is not limited thereto. The fluorescent wheel 16 includes, for example, a phosphor wheel configured with phosphor powder, and may convert the incident beam into a color light with a wavelength different from the wavelength of the incident beam. The optical filter wheel 18 includes one or more filter areas corresponding to specific wavelengths, and may filter out the light beam with unwanted wavelengths in the light beam. In the embodiment, the filter element 100 (or the filter element 100A or the filter element 100B) is located between the light combining element 14 and the fluorescent wheel 16, and the filter element 100 may limit and adjust the spectra of the light beams I1 and I2 before the light beams I1 and I2 pass through the fluorescent wheel 16 and the optical filter wheel 18.

Figure 6:
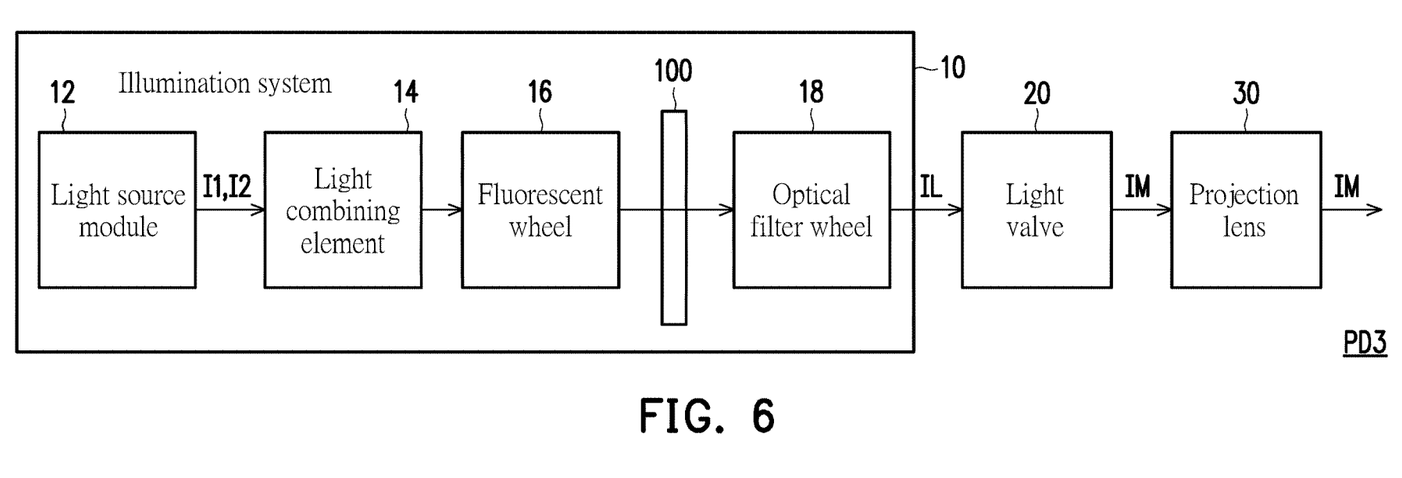
FIG. 6 is a schematic structural diagram of a projection device according to yet another embodiment of the disclosure.

FIG. 6 is a schematic structural diagram of a projection device according to yet another embodiment of the disclosure. Please refer to FIG. 6. A projection device PD3 of the embodiment of FIG. 6 is similar to the projection device PD2 of FIG. 5, with the differences as described below. In the embodiment, the filter element 100 is located between the fluorescent wheel 16 and the optical filter wheel 18, and limits and adjusts the spectra of multiple light beams passing through the fluorescent wheel 16.

Figure 7:
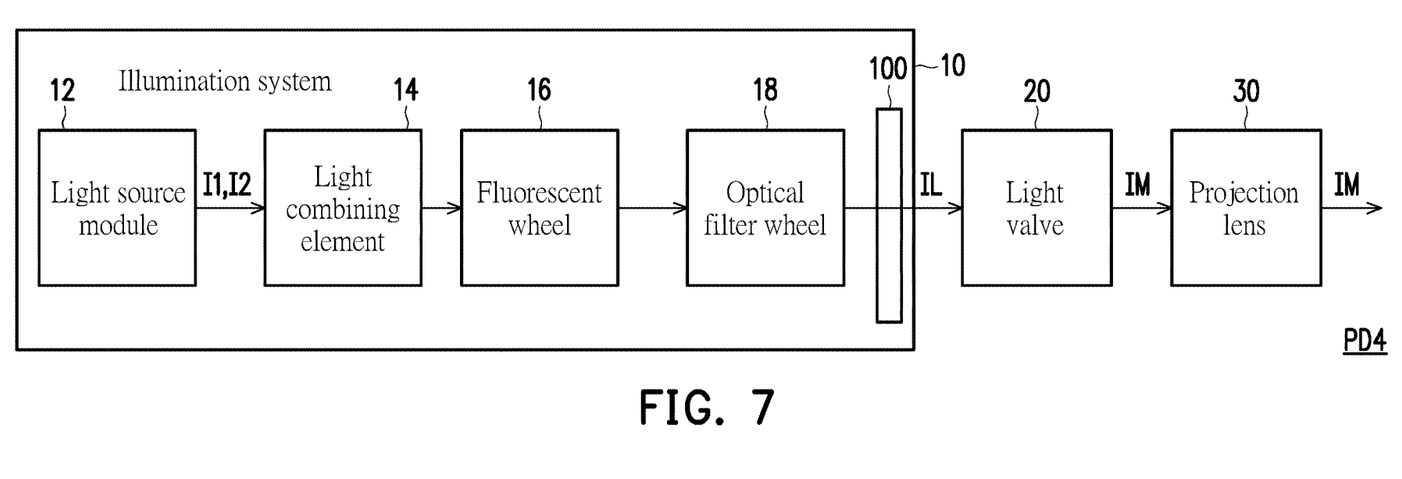
FIG. 7 is a schematic structural diagram of a projection device according to still another embodiment of the disclosure.

FIG. 7 is a schematic structural diagram of a projection device according to still another embodiment of the disclosure. Please refer to FIG. 7. A projection device PD4 of the embodiment of FIG. 7 is similar to the projection device PD2 of FIG. 5, with the differences as described below. In the embodiment, the filter element 100 is located between the optical filter wheel 18 and the light valve 20, and limits and adjusts the spectra of multiple light beams passing through the fluorescent wheel 16 and the optical filter wheel 18.

In summary, the embodiments of the disclosure have at least one of the following advantages or effects. In the embodiment of the disclosure, the average thickness of the second area of the film in the peripheral region on the filter element is greater than the average thickness of the first area of the film in the central region, so that the phase difference of the light beam after passing through the first area and the second area of the film is closer. Thus, the filter element may still have the similar filtering effect when the incident angle is relatively large, thereby improving the phenomenon of blue shift in the transmission band of the filter element and the problem of uneven color of the projection device.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A filter element, configured on a transmission path of at least one light beam, the filter element comprising: a substrate and a film, wherein
   the film is located on a surface of the substrate, the film comprises a first area and a second area, the first area comprises a center, the center corresponds to a central axis of the at least one light beam, a distance between the second area and the center is greater than a distance between any point in the first area and the center, and an average thickness of the second area of the film is greater than an average thickness of the first area of the film.

2. The filter element according to claim 1, wherein the film further comprises a third area, a distance between the third area and the center is greater than a distance between any point in the second area and the center, and an average thickness of the third area of the film is greater than the average thickness of the second area of the film.

3. The filter element according to claim 1, wherein the filter element comprises a first transmission band, a second transmission band, and a cut-off band, bandwidths of the first transmission band and the second transmission band are greater than 30 nm, the cut-off band is located between the first transmission band and the second transmission band, and a bandwidth of the cut-off band is greater than 10 nm.

4. The filter element according to claim 1, wherein the second area adjoins and surrounds the first area, the film at a boundary between the first area and the second area has a level difference, the level difference is the difference between the thickness of the first area of the film and the thickness of the second area of the film in the direction of a normal line of the substrate.

5. The filter element according to claim 4, wherein the first area and the second area are disposed concentrically around the center.

6. The filter element according to claim 1, wherein the film has a greater thickness of the first area where the distance from the center is larger.

7. The filter element according to claim 1, wherein the filter element further comprises an actuating device, and the actuating device is configured to move the filter element out of or into the transmission path of the at least one light beam.

8. The filter element according to claim 1, wherein the average thickness of the film $d=\delta*\lambda/(4*\pi*\cos[\sin^{-1}((n_0/n)*\sin\theta_0)])$, $\lambda$ is a wavelength of the at least one light beam, $n$ is a refractive index of the film, $n_0$ is a refractive index of air, $\theta_0$ is an included angle between the light beam and the normal line of the substrate, $\pi$ is a circular constant, and $\delta$ is a phase difference and is $M/2$, where $M$ is an odd number greater than 0.

9. A projection device, comprising: an illumination system, a light valve, and a projection lens, wherein the illumination system is adapted to provide an illumination beam, the light valve is located on a transmission path of the illumination beam, and is configured to convert the illumination beam into an image beam, and the projection lens is located on a transmission path of the image beam, and is configured to project the image beam out of the projection device,
   wherein the illumination system comprises a light source module and a filter element, the light source module is configured to emit a plurality of light beams, the illumination beam comprises at least part of the plurality of light beams, the filter element is located on transmission paths of the plurality of light beams and is located between the light source module and the light valve, and the filter element comprises: a substrate and a film, wherein the film is located on a surface of the substrate, the film comprises a first area and a second area, the first area comprises a center, the center corresponds to central axes of the plurality of light beams, a distance between the second area and the center is greater than a distance between any point in the first area and the center, and an average thickness of the second area of the film is greater than an average thickness of the first area of the film.

10. The projection device according to claim 9, wherein the projection device further comprises a light combining element, disposed on the transmission paths of the plurality of light beams, and the filter element is located between the light combining element and the light valve.

11. The projection device according to claim 10, wherein the projection device further comprises a fluorescent wheel and an optical filter wheel, located on the transmission paths of the plurality of light beams and located between the light combining element and the light valve, and the filter element is located between the light combining element and the fluorescent wheel.

12. The projection device according to claim 10, wherein the projection device further comprises a fluorescent wheel and an optical filter wheel, located on the transmission paths of the plurality of light beams and located between the light combining element and the light valve, and the filter element is located between the fluorescent wheel and the optical filter wheel.

13. The projection device according to claim 10, wherein the projection device further comprises a fluorescent wheel and an optical filter wheel, located on the transmission paths of the plurality of light beams and located between the light combining element and the light valve, and the filter element is located between the optical filter wheel and the light valve.

14. The projection device according to claim 9, wherein the filter element further comprises an actuating device, and the actuating device is adapted to move the filter element out of or into the transmission paths of the plurality of light beams.

15. The projection device according to claim 14, wherein the projection device comprises a first mode and a second mode, wherein in the first mode, the filter element is located on the transmission paths of the plurality of light beams, and in the second mode, the filter element is not located on the transmission paths of the plurality of light beams.

16. The projection device according to claim 9, wherein the film further comprises a third area, a distance between the third area and the center of the first area is greater than a distance between any point in the second area and the center, and an average thickness of the third area of the film is greater than the average thickness of the second area of the film.

17. The projection device according to claim 9, wherein the film comprises a first transmission band, a second transmission band, and a cut-off band, bandwidths of the first transmission band and the second transmission band are greater than 30 nm, the cut-off band is located between the first transmission band and the second transmission band, and a bandwidth of the cut-off band is greater than 10 nm.

18. The projection device according to claim 9, wherein the second area adjoins and surrounds the first area, the film at a boundary between the first area and the second area has a level difference, the level difference is the difference between the thickness of the first area of the film and the thickness of the second area of the film in the direction of a normal line of the substrate.

19. The projection device according to claim 18, wherein the first area and the second area are disposed concentrically around the center.

20. The projection device according to claim 9, wherein the average thickness of the film $d=\delta*\lambda/(4*\pi*\cos[\sin^{-1}((n_0/n)*\sin\theta_0)])$, $\lambda$ is a wavelength of the at least one light beam, n is a refractive index of the film, $n_0$ is a refractive index of air, $\theta_0$ is an included angle between the light beam and the normal line of the substrate, $\pi$ is a circular constant, and $\delta$ is a phase difference and is M/2, where M is an odd number greater than 0.

* * * * *